United States Patent [19]

Ellion et al.

[11] 4,272,257
[45] Jun. 9, 1981

[54] LIQUID-VAPOR SEPARATOR

[75] Inventors: M. Edmund Ellion, Arcadia; J. Ward Putt, Los Angeles; John J. Montich, Redondo Beach, all of Calif.

[73] Assignee: Hughes Aircraft Company, Culver City, Calif.

[21] Appl. No.: 747,469

[22] Filed: Dec. 6, 1976

[51] Int. Cl.³ .............................................. B01D 53/22
[52] U.S. Cl. ......................................... 55/38; 55/159; 210/488
[58] Field of Search ..................... 55/36, 38, 159, 173; 210/488, 492, 497R, 498

[56] References Cited

U.S. PATENT DOCUMENTS

| | | | |
|---|---|---|---|
| 1,642,864 | 9/1927 | Williams | 210/488 X |
| 3,486,302 | 12/1969 | Paynter | 55/159 |
| 3,648,843 | 3/1972 | Pearson | 210/488 X |
| 3,854,905 | 12/1974 | Balzer et al. | 55/159 |
| 3,933,448 | 1/1976 | Di Peri | 55/159 |

FOREIGN PATENT DOCUMENTS

| | | |
|---|---|---|
| 461149 | 2/1937 | United Kingdom . |
| 764583 | 12/1956 | United Kingdom . |
| 794372 | 4/1958 | United Kingdom . |
| 841207 | 7/1960 | United Kingdom . |
| 875340 | 8/1961 | United Kingdom . |
| 936413 | 9/1963 | United Kingdom . |
| 996945 | 6/1965 | United Kingdom . |

OTHER PUBLICATIONS

Fipoca, The Outstanding Element with Indefinite Life, Rellumit Corp. (Limited), London, 11/1962.

*Primary Examiner*—Robert H. Spitzer
*Attorney, Agent, or Firm*—Allen A. Dicke, Jr.; W. H. MacAllister

[57] ABSTRACT

Stacked plates each have a plurality of thin etched flow passages to be employed in a tank containing gas and liquid for separation to provide gas free liquid. The liquid surface tension in the flow passages that are exposed to the gas provides a force to prevent the gas from entering the liquid galleries until the tank is void of liquid. Such separation is useful in fuel tanks in near zero gravity environment as well as in other separation duties.

4 Claims, 6 Drawing Figures

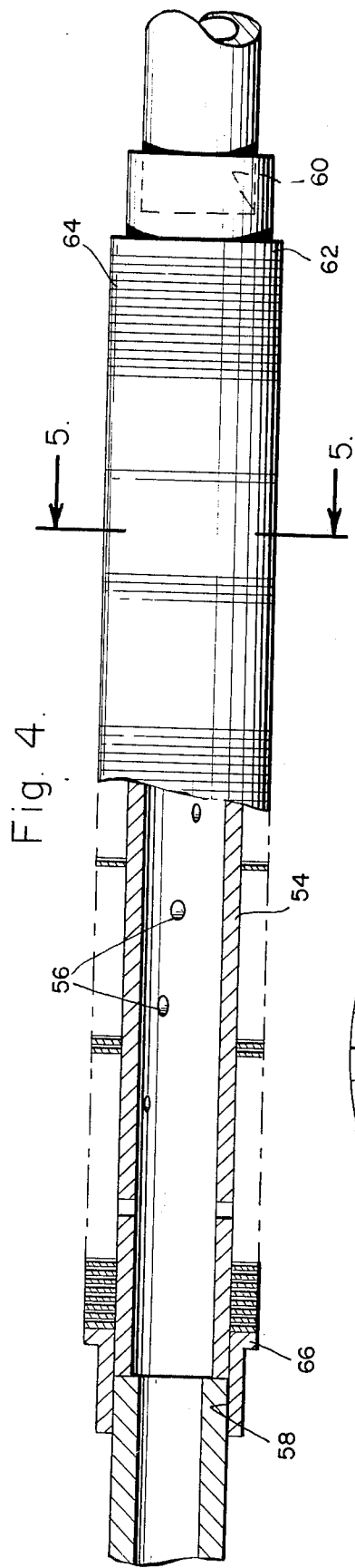
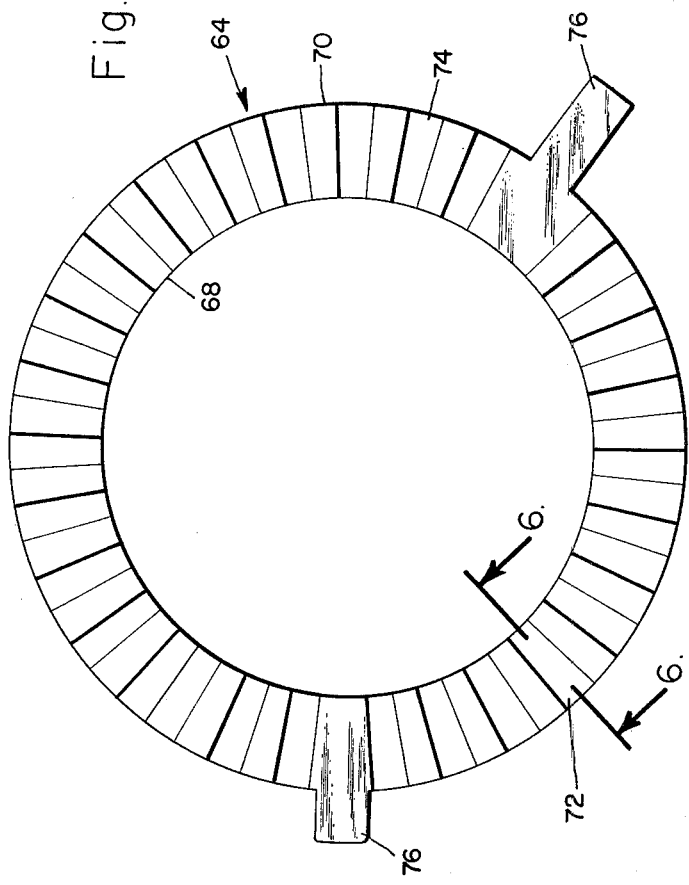

LIQUID-VAPOR SEPARATOR

BACKGROUND OF THE INVENTION

This invention is directed to a liquid-vapor separator structure wherein surface tension forces are employed to separate liquid from the vapor and is particularly useful in near-zero gravity environment.

Spinning or accelerating a spacecraft provides the force to separate the liquid from the gas or vapor in the propellant tanks. However, when a non-spinning body is in free fall, some means must be employed to cause the liquid to be delivered to that it is available for use without also allowing the pressurizing gas to exit from the tank. Mechanical devices such as pistons, bladders, metallic bellows, elastomeric diaphragms, metallic diaphragms and rolling diaphragms have each been considered and tested. Each has advantages and disadvantages but the problems they now present in weight and reliability require further investigation and development. Whenever there is a moving part, as in each of the above listed systems, reliability is reduced.

As a result of that, capillary separation systems have been contemplated. The use of surface tension as a separation method in acceleration fields less than $10^{-4}$ g has previously been accomplished by devices utilizing fine mesh, double dutch twill screen. The surface tension forces resulting from micron size small openings in the screen have been utilized to provide liquid communication through the screen while preventing the passage of gas through the screen. In double dutch twill woven screen each shute wire passes successively over two and under two warp wires. The shute wires are driven up close and deformed so that the mesh count is in excess of twice the sum of the wire count. The resultant port openings are of triangular shape and no through openings are visible except when the screen wire is viewed at an angle. The shute wires and warp wires are on the order of 0.001 inches in diameter and the finished woven wire screens have a 10 micron pore. Such a screen does not have sufficient structural integrity to be used alone, and must be supported. Also, careful handling is required to prevent bending and stretching because opening of the pores reduces the differential pressure that can be supported. Devices using this fine mesh screen concept are described in an article entitled, "A Survey of Current Development in Surface Tension Devices for Propellant Acquisition" by S. C. DeBrock et al. in Journal of Spacecraft and Rockets, Vol. 8, No. 2, February 1971, pgs. 83–98.

Thus, a new concept is required to provide a reliable propellant management device for a spacecraft which is to operate in a very low omnidirectional gravity field and therefore needs a suitable propellant management device to provide gas-free propellant.

SUMMARY OF THE INVENTION

In order to aid in the understanding of this invention, it can be stated in essentially summary form that it is directed to a liquid-vapor separator which has a recess in a plate and a cover plate to provide a thin flow passage therein which sized to provide continuous gas-free liquid flow even though the source is a two-phase liquid-vapor mixture.

It is thus an object of this invention to provide a liquid-vapor separator which is reliable and does not suffer from the handling disadvantages of the prior art woven screen-type of separator. It is another object to provide a separator which relies on surface tension as a separation force and which employs thin passageways for employing liquid surface tension to pass liquid and not gas. It is a further object to provide a propellant management device which can be more reproducibiliy manufactured than the fine mesh screen of the prior art. It is a further object to make a thin flow path by chemical etching the path on the surfaces of stacked plates to provide uniformity of the thickness of the path to control the pore size and to manage the surface finish of the path so that performance is more predictable.

Other objects and advantages of this invention will become apparent from the study of the following portion of the specification, the claims and the attached drawings.

BRIEF DESCRIPTION OF THE DRAWINGS

FIG. 4 is an enlarged side elevational view, with parts broken away and parts taken in section of one of the separators of this invention.

FIG. 5 is a further enlarged transverse section taken generally along the line 5—5 of FIG. 4.

FIG. 6 is a further enlarged section taken generally along the line 6—6 of FIG. 5

DESCRIPTION OF THE PREFERRED EMBODIMENTS

Figure 1:
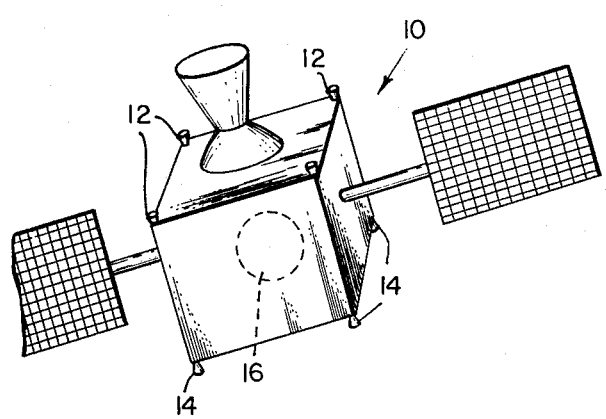
FIG. 1 is a perspective view of a spacecraft, which is partly broken away and showing some of the attitude control equipment on the spacecraft.

FIG. 1 illustrates spacecraft 10 which is illustrated as a communication satellite having external solar cell panels and having suitable electronic equipment and antenna structure for receiving and retransmitting radio signals. Spacecraft 10 is illustrated as being stabilized on all three of its relative axes and is organized to remain in a free fall orbit. Its orientation on all three axes is accomplished by the selective firing of attitude jets, two of which are illustrated at 12 and 14. A sufficient number of attitude jets are provided and are oriented in appropriate directions so that attitude correction can be selectively applied to the spacecraft about each of its three rotational axes.

Figure 2:
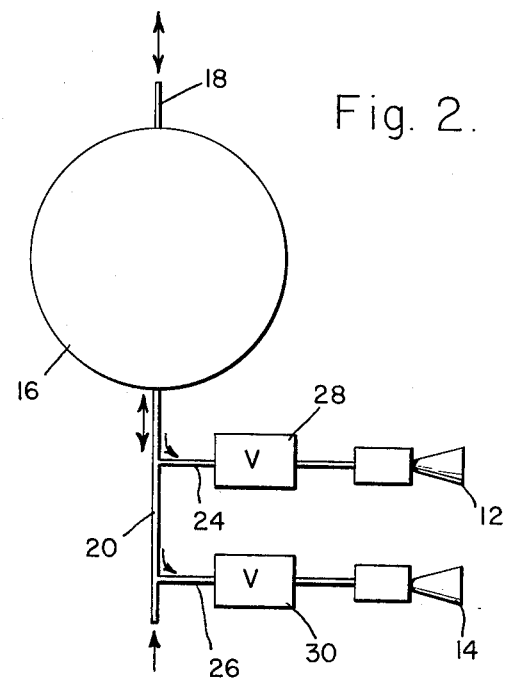
FIG. 2 is a schematic diagram of part of the attitude control equipment.

The schematic diagram of FIG. 2 shows propellant tank 16 as having vent line 18 by which the tank is vented and the later-filled tank is pressurized. Fill and outlet line 20 is provided with a suitable fill valve to permit the gallery to be filled to deliver liquid to the tank for filling. The vapor from the tank during filling is vented from vent line 18 which also serves as an inlet for pressurization when tank filling and venting is complete. Vent line 18 is mechanically joined to connector 40 for its support, but line 18 is connected to vent only tank 16, not the interior of the galleries.

Outlet line 20 supplies liquid through liquid propellant lines 24 and 26 respectively through propellant control valves 28 and 30 to attitude jets 12 and 14. Thus, propellant liquid delivered from propellant tank 16 to outlet line 20 is available to the attitude jets.

Figure 3:
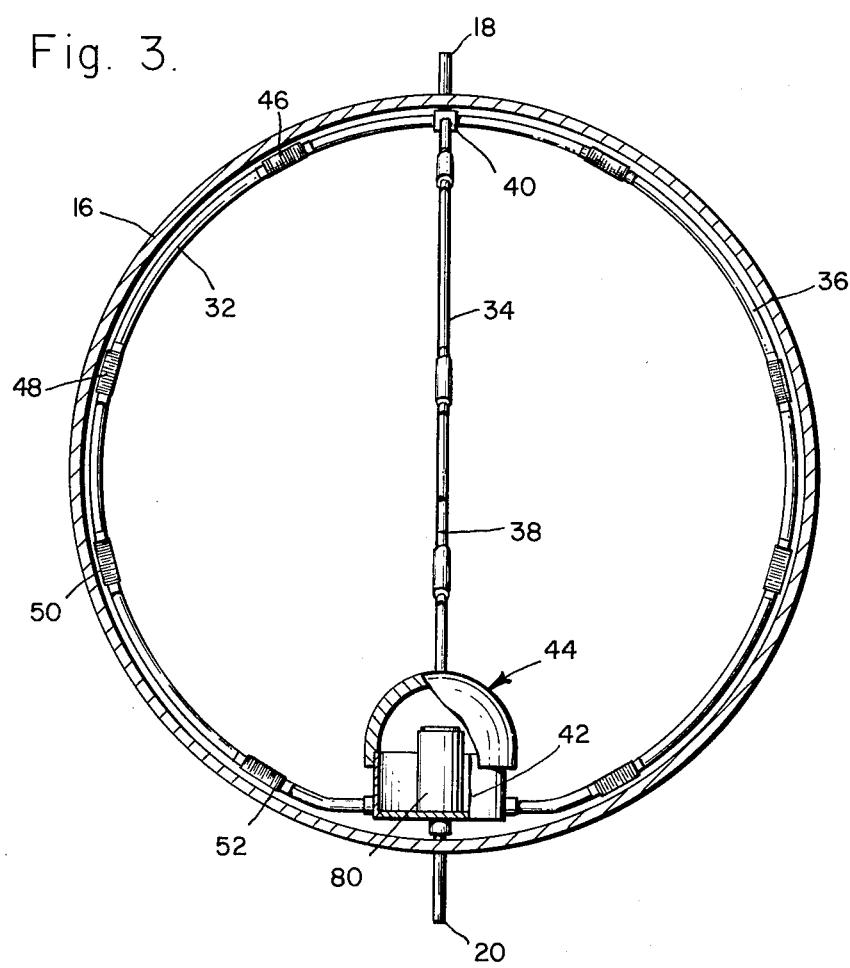
FIG. 3 is a transverse section through the propellant tank which contains the liquid-vapor separator propellant management device of this invention.

FIG. 3 is a section through tank 16 showing the liquid collection galleries. In this case, four curved galleries 32, 34, 36 and 38 are shown. They are connected together at the top by gallery junction connector 40 which is mechanically supported by vent line 18 thereon. Each of the galleries is tubular, and is curved to fit closely against the interior surface of propellant tank 16. At the outlet end, the galleries are connected into the bottom of shell 42 of bubble-trap 44. Bubble-trap 44 is enclosed and has outlet line 20 as its outlet.

Each of the liquid galleries has one or more liquid-vapor separators therein. Line 32 contains liquid-vapor separators 46, 48, 50 and 52. Each of the other galleries has the same number of separators therein, although they may be arranged at different locations along the length of the respective galleries. FIG. 4 shows liquid-vapor separator 48 in enlarged detail.

As seen in FIG. 4, liquid-vapor separator 48 has mandrel 54 therein which is generally in the form of a cylindrical tube. The ends of mandrel 54 contain two recesses 58 and 60 into which the tubes which make up the interconnecting portions of the gallery are inserted and secured. Welding is an appropriate means of a securement. Shoulder 62 is formed at one end of the mandrel beyond the perforations 56.

A plurality of discs or plates 64 is stacked on the mandrel against shoulder 62. Collar 66 is pressed on to compress the stack of discs and when appropriate compression pressure is achieved, collar 66 is secured to the mandrel as by welding or clamping. Now, discs 64 are clamped in place with proper axial pressure.

As seen in FIG. 5, the plates are circular discs 64 which have a circular interior wall 68 of radius R and a circular outer wall 70 of radius R, about the same axis. The axial ends of each of the discs are each limited by a surface to define disc thickness. One of the end surfaces of each disc is flat while the other carries recesses therein. Recesses 72 and 74 are indicated in FIG. 5. In a preferred embodiment, the recesses are 0.050 inches long between walls in the radial direction, 0.020 inches wide in the circumferential direction at outer surface 70 and are 0.0004 inches deep in the axial direction.

Ears 76 and 78 on each of the discs of the separator structure permit orientation of the individual discs so that when they are compressed on the stack they are each oriented the same so that the stack can carry metal-to-metal compression without disc distortion. The interior diameter 68 of the disc is sufficiently larger than the outside diameter of mandrel 54 that there is flow passage from the inner termination of the passages at the inside wall around the outside of the mandrel and into the mandrel through perforations 56.

Each of these passages provides a structure whereby pressure differentials actuated to force fluid from the liquid vapor mix in the tank into the gallery will produce only liquid flow through the passage, gas flow being prevented by surface tension effects at all gas-liquid interface within the passages. Thus, when the gallery is filled with a liquid and purged of gas vapor, the gallery accepts only liquid from the tank. The length of the passage, in conjunction with the depth of it is a function of the amount of vibration that can be applied without gas break-through. Thus, liquid is delivered to the gallery.

By this structure, bubble-free liquid is delivered into bubble-trap 44. Bubble-trap 44 is provided as a secondary, safety separator and does not in normal operating condition receive any vapor or gas bubbles. It is normally full of liquid, and is filled and purged upon the initial filling. The vapor present with the liquid may be the vapor of the same liquid, or may be another gas which is present for pressurizing vapor suppression, flammability control or the like.

Separator 80 is also made of a mandrel with a shoulder and a collar and a stack of discs or plates compressed therebetween. The stacked discs are each similar to a disc 64 so that liquid is passed through the passages from the exterior to the interior of separator 80. Outlet line 20 is connected to the interior of the separator so that a second separation takes place, if it is required.

With this understanding of the structure, it is clear that the liquid-vapor separator of this invention can be more reproducibly manufactured. The fine mesh screen of the prior art is prone to damage which is difficult to detect by visual inspection. The damage consists of enlargement of the pores through handling and fabrication. Since the separation pressure is controlled by the largest pore, great care must be exercised to achieve an operative device. In the present structure passages 72 and 74, and the rest of the passages can be produced by the chemical etching process and thus can be controlled more uniformally. Furthermore, critical dimensions such as surface finish and passage size are held to accurate tolerances. With this advantage the performance is more predictable. Furthermore, the liquid-vapor separator of this invention can be assembled free of contamination and can be more easily cleaned if it should become contaminated. Because each separation passage is constructed from two pieces that form the retangular passage, each can be separated and cleaned to the highest standards before manufacturing. Furthermore, during fabrication the two opposing faces do not have to be handled. On the other hand, in fine mesh screen contamination is trapped between the layers of wire used in the woven structure.

After it is assembled, the liquid-vapor separator of this invention is mechanically stronger and therefore is less susceptible to damage during handling, testing and operational use. Furthermore, the liquid vapor separator of this invention can be made of the same materials as the tank. The prior art fine mesh screen is limited in that only certain material can be woven. The only fine mesh screen available which provides a sufficiently high differential pressure is woven from stainless steel wires; therefore the tank must be made of stainless steel to facilitate joining technique and prevent galvanic corrosion. The liquid-vapor separator of this invention can be made of titanium which achieves a weight savings in the propellant tank and liquid-vaporator separator subsystem. The structure provides separation which is capable of retaining liquid in the galleries during high vibration loads, than possible with the prior art woven screen such as during boost into orbit.

This invention having been described in its preferred embodiment, it is clear that its susceptible to numerous modifications and embodiments within the ability of those skilled in the art and without the exercise of the inventive faculty. Accordingly, the scope of this invention is defined by the scope of the following claims.

What is claimed is:

1. The method of separating liquid from vapor in a substantially zero g environment comprising the steps of:

providing an etched flow passage so that it extends from a first wall to a second wall with the flow passage having sufficiently small dimension that liquid is passed through the passage in preference to vapor due to liquid surface tension forces; and positioning the passage in a tank for containing liquid and vapor so that liquid is preferentially delivered through the passage for delivery from the tank.

2. The method of separating liquid from vapor in a substantially zero g environment comprising the steps of:

placing and removing liquid from a tank so that both liquid and vapor are present in the tank;

forming a flow passage having a flow direction therethrough and a sufficiently small dimension normal to the flow direction so that liquid is passed through the passage in preference to vapor due to liquid surface tension forces;

positioning the passage in the tank so that one end of the passage is exposed to the interior of the tank and the other end of the passage is connected to a gallery for delivery of liquid from the tank so that liquid delivery in preference to vapor delivery is achieved from the tank; and separating liquid from vapor in the tank by preferentially passing liquid through the flow passage and delivering the liquid into the gallery.

3. The method of claim 2 wherein the flow passage is formed with a length and depth sufficient that when a predetermined amount of vibration is applied thereto only liquid is delivered to the gallery without gas breakthrough even in the presence of vibration.

4. The tank of claim 2 including after the liquid-vapor separation step and delivering the liquid into the gallery the further step of:

providing a second liquid-vapor separator serially connected after the gallery to perform the additional step of separating subsequently vaporized vapor bubbles from the flow stream of liquid provided by the first liquid-vapor separator; and discharging the liquid from the additional separating step from the tank.

* * * * *